Patented June 2, 1925.

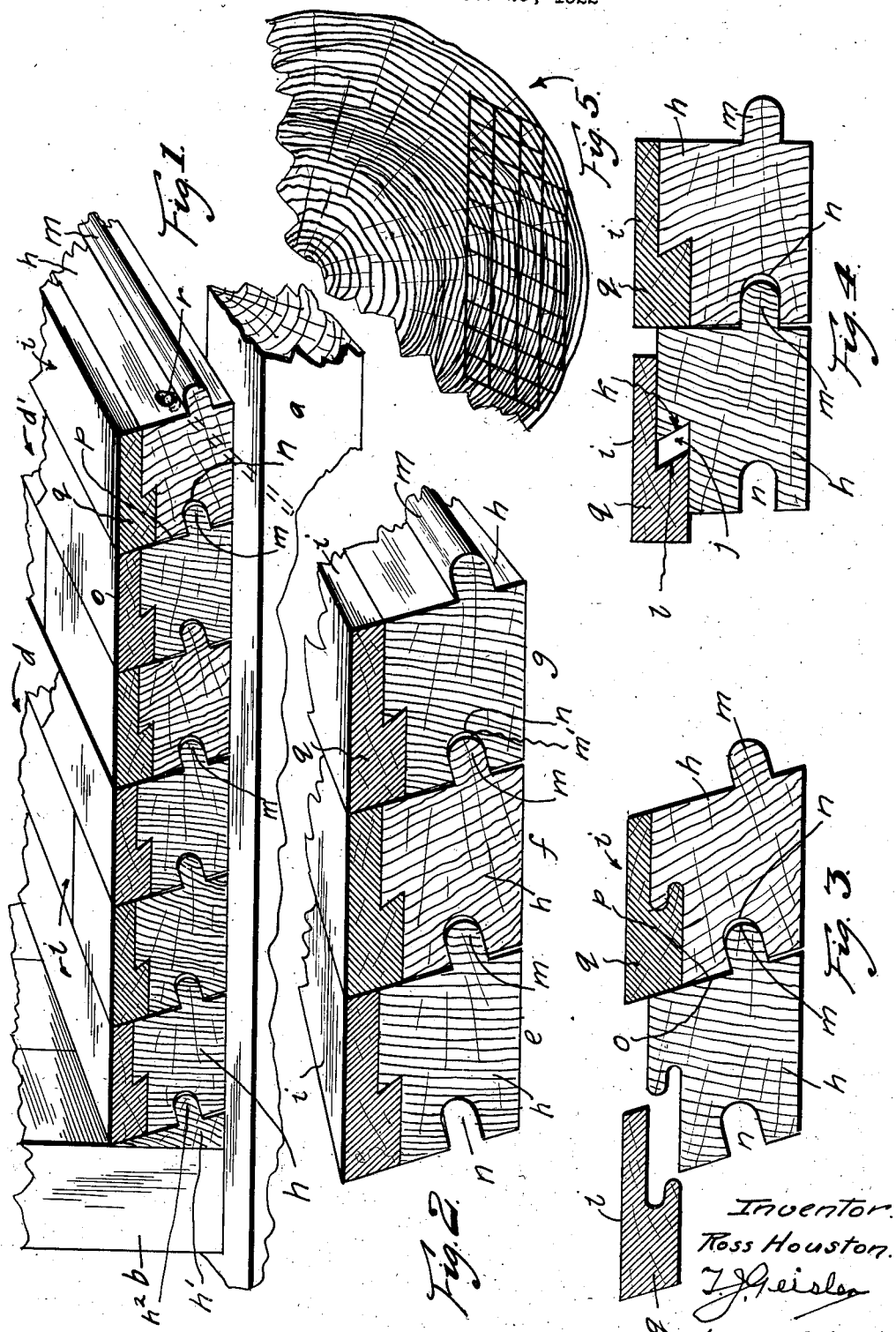

1,540,128

UNITED STATES PATENT OFFICE.

ROSS HOUSTON, OF TACOMA, WASHINGTON.

COMPOSITE UNIT FOR FLOORING AND THE LIKE AND METHOD FOR MAKING SAME.

Application filed December 28, 1922. Serial No. 609,444.

*To all whom it may concern:*

Be it known that I, ROSS HOUSTON, a citizen of the United States, and a resident of the city of Tacoma, county of Pierce, and State of Washington, have invented a new and useful Improvement in Composite Units for Flooring and the like and Methods for Making Same, of which the following is a specification.

My invention concerns what is commonly known as matched flooring, or boards, made of wood or having a base constructed of wood.

As well known, flooring and other high grade boards obtained from soft woods are selected from material having more or less compact grain. These woods when drying tend to check and crack across the grain, that is radially thereto. In other words, they tend to check or split along the intersections of the medullary rays with the growth rings of the trees.

Hence it is highly desirable to shape, or profile, the pieces of wood with reference to their grain, so that when complementary pieces are matched the grain of each piece will be so disposed as to give the best results in wear. And the primary object of my invention is to provide board-units which, when laid into a floor, or other surface, will embody all those features which assure the best results in service.

A further object of my invention is to provide composite boards each made up of a plurality of composite narrow units, and each of the latter to consist of a base of wood, for example soft wood, and a top, or finishing piece, of hard wood, or harder, better wearing, or better appearing material. Also to provide composite strips, or units, from which such boards may be made.

In this way my invention provides for reclamation, and the use of strips of both soft woods and hard woods for producing a high grade of flooring, or other surface, which strips otherwise, because of their size, would be usable only, if at all, for the manufacture of a low priced commodity.

Another advantage of my invention is, it permits the laying of a hard wood flooring by a single operation, while with the usual flooring material the lower course must be first secured in place, and then the next course secured on the course laid. In other words, since each unit of my flooring is composed of a sub-base of soft wood having firmly secured thereon a top of hard wood, and the soft wood base is easily penetrated by a nail, the operation of securing the flooring in place is greatly simplified. At present many floors are laid in three courses, namely a base course, a sub-course of better grade soft wood, and a top course of hard wood; and the latter has frequently to be bored in those places where the retaining nails or pins are to be inserted, so as to prevent splitting.

My invention further has for its object the fastening of the top-piece securely on its base. Preferably I accomplish this result by providing a flooring or surface consisting of a plurality of composite uniform units each composed of a base piece and a top piece, the base piece being provided with a sunken portion at one side of its top face, the top piece being provided on its bottom face with a protuberance adapted to be seated in said sunken portion, the side of the latter overhanging the abutting side of said protuberance, the sunken portion of the base piece of one unit lying below the top of the base piece of the adjacent unit. In this way the side face of the base piece of one unit will provide a locking abutment for the top piece of the adjacent unit. Furthermore, the base pieces of said units are preferably provided with interlocking elements.

A further object of my invention is to interlock the abutting side faces of the composite units by complementary tongue and groove elements for example, and in connection with this feature so to shape the wooden base pieces with reference to their grain that shrinkage will not be apt to produce loose joints or cracks between the adjacent boards or units.

Other features of my invention are hereinafter described.

In the accompanying drawings:

Fig. 1 shows in perspective a section of my composite units laid into a matched flooring abutting at one side with a wall; the flooring is represented as composed of boards each consisting of three units built according to my invention; the section lines are also intended to illustrate the direction of the grain of the wood;

Fig. 2 shows a perspective detail of one of these boards;

Fig. 3 illustrates one type of interlocking abutments which may be provided on the joined faces of the base-piece and the top-piece of each unit thereby to prevent their separation without first displacing them relatively to each other as mentioned;

Fig. 4 illustrates another type of similar interlocking means—those preferred by me; this figure further illustrates that the making of the abutting side faces of the units may be made perpendicular to their under side instead of making those faces oblique as shown in the other figures, altho the oblique construction is preferred by me; and Fig. 5 represents diagrammatically a section of a log, and illustrates how a large number of strips may be cut therefrom out of which to make my units, or the bases of the latter.

In Fig. 1 $a$ represents a floor joist, $b$ a section of a wall, $d$, $d'$ flooring boards made in accordance with my invention. Each of these flooring boards is composed of three units, $e$, $f$, $g$, as shown in Fig. 2. However, the making of boards of any number of units, or the employment of the units by themselves is a matter of choice.

Each of said units consists of a base-piece $h$ and a top-piece $i$. The bearing faces of these pieces are provided with interlocking protuberances adapted to prevent the separation of these pieces without first displacing one of them relatively to the other in a direction more or less parallel with the plane of the under side of the base-piece.

Preferably these interlocking protuberances are constructed as shown in Fig. 4, namely, the upper face of the base-piece $h$ is provided at one end with a recess $j$ thus leaving an oblique overhanging wall $k$, while the under face of the top-piece $i$ is correspondingly constructed, thus providing a lip $l$ projecting at its base as shown in Fig. 4 and thus under said overhanging wall $k$. Hence, when the two pieces are joined together, as shown in the right hand unit of Fig. 4, it would be impossible to lift up the top-piece to the left; and as such displacement is prevented by the abutting unit of the floor, or the wall $b$ as shown in Fig. 1, the top-piece is securely held in place irrespective of the cement by which the base and top pieces are united. When the units are shaped as illustrated in Figs. 1 and 2, a filler piece as $h'$ shown in Fig. 1 is preferably used; this filler piece having a tongue $h^2$ corresponding with the tongue $m$ of the unit.

Preferably I make the abutting side faces of the units with oblique angles as shown in Fig. 3, so that one of such faces will underlie and constitute a support for the abutting face of the adjoining unit. Furthermore, the angles of said abutting faces are preferably such as to leave a space between them at the base which permits a close joint to be made at the top surfaces between abutting units. It also prevents any direct strain being taken up by the surfaces $o$ and $p$.

Instead of making the interlocking protuberances of the bearing faces of the base-piece as shown in Fig. 4, these protuberances may be made as illustrated in Fig. 3.

One of the side faces of the base-piece of each unit is made with a tongue $m$, and the opposite side face is made with a corresponding groove $n$. These tongue-and-groove elements are preferably arranged as illustrated in Figs. 1, 2 and 3, so that the units can not be moved apart by any relative movement in a horizontal plane. The tongue is made of lesser length than that of the groove $n$ in order to provide an air space $m'$ between these parts at the tip of the tongue.

In order to prevent loose joints and cracks between adjacent units, or boards composed of the latter, due to shrinkage in width of the tongue relative to the width of its groove, I so profile or shape the bases of the units that the grain thereof will run more or less vertical, for the reasons already mentioned.

The grain of the units used for laying a floor, or other surface, must extend substantially in the same direction, so that the factors of shrinkage and swelling which may enter into the construction, will be practically uniform in volume and direction. For this reason all strips of which the surface is to be built must be profiled with reference to their grain, so that when assembled to form the surface their grain will extend substantially in the same direction; and this applies to both the base and top piece of which each unit is composed.

In practicing my invention I find it convenient to resaw the pieces of wood or deals from which my units are to be made into a plurality of narrow equilateral strips which are then shaped and profiled with respect to their grain as described. And the interlocking protuberances of the upper and lower faces of the base piece and top-piece should be shaped as shown. For, as well known, a horizontal member supported on its ends is subjected to different forces within the member itself; in short the load tends to flex the member, so as to concave it in respect to the load; and thus sets up compression in the upper surface, and tension in the lower surface. Thus in my flooring the load imposed upon it subjects the abutting corners at the top pieces to a compression strain. Therefore I bring the thicker portion $q$ of the top-piece over the groove $n$. In consequence as shown in the drawings, such portion extends below the top-piece of the adjoining unit, and bears directly on the base of the latter. In this way the horizontal displacement of the top piece is prevented.

Furthermore, since the grooved side of the base is more likely to break down under the load, I extend said thicker portion $q$ a substantial distance inward from the groove $n$, so as to distribute the load over the middle, solid portion of the base. And when the abutting faces of adjoining units are oblique the support of the thicker portion $q$ of the top-piece by the oblique wall portion of the adjoining unit will so distribute the load as to make a break down in my flooring practically impossible.

The top piece is usually cemented on the base, therefore the grains in these pieces must so complement each other that shrinkage and swelling will not relatively exceed the elastic limit of the cement and thus cause a rupture of the latter. The cement used should be impervious to moisture, so that moisture will not re-enter the structure as a factor. The reason for this is that the units should retain their original dimensions after their pieces have been cemented together, and not require refinishing; but, if the cement had a tendency to absorb moisture, it might necessitate the refinishing of the unit after having been kept in stock for some time; or even after the floor were laid.

I claim:

1. A flooring or surface consisting of a plurality of composite uniform units, each composed of a base-piece and a top-piece, the base-piece being provided with a sunken portion at one side on its top face, the top piece being provided on its bottom face with a protuberance adapted to be seated in said sunken portion, the side of the latter over-hanging the abutting side of said protuberance, whereby the sunken portion of the base-piece of one unit will lie below the top of the base piece of the adjacent unit, and the side face of the base piece of one unit will provide a locking abutment for the top piece of the adjacent unit.

2. A flooring or surface consisting of a plurality of composite uniform units, each composed of a base piece and a top piece, the base piece being provided with a sunken portion at one side of its top face, the top piece being provided on its bottom face with a protuberance adapted to be seated in said sunken portion, the side of the latter overhanging the abutting side of said protuberance, whereby the sunken portion of the base-piece of one unit will lie below the top of the base piece of the adjacent unit and the side face of the base piece of one unit will provide a locking abutment for the top-piece of the adjacent unit, the base piece of said units being provided with interlocking elements.

3. A flooring, or surface, consisting of a plurality of composite units, each composed of a base-piece and a top-piece, said units being arranged side by side in the same plane, the joined faces of said pieces being provided with interlocking protuberances adapted to require the relative displacement of the top-piece in a direction approximately parallel with the plane of its under side, in order to separate said pieces, the abutting side faces of the base pieces of said units being provided with interlocking elements of the tongue and groove type respectively, the interlocking protuberance of said top-piece being thickest at that side located over the groove of its base piece and extending below the top-piece of the adjoining unit.

4. A flooring, or surface, consisting of a plurality of composite units, each composed of a base-piece and a top-piece, said units being arranged side by side in the same plane, the joined faces of said pieces being provided with interlocking protuberances adapted to require the relative displacement of the top-piece in a direction approximately parallel with the plane of its under side, in order to separate said pieces, the abutting side faces of the base pieces of said units being provided with interlocking elements of the tongue and groove type respectively, the interlocking protuberance of said top-piece being thicker at that side located over the groove of its base-piece and extending below the top-piece of the adjoining unit also extending a substantial distance towards the longitudinal middle of the unit.

5. A flooring, or surface, consisting of a plurality of composite units, each composed of a base-piece and a top-piece, said units being arranged side by side in the same plane, the joined faces of said pieces being provided with interlocking protuberances adapted to require the relative displacement of the top-piece in a direction approximately parallel with the plane of its under side, in order to separate said pieces, the abutting side faces of the base pieces of said units being oblique and provided with interlocking elements of the tongue and groove type respectively, the interlocking proturberances of said top-piece being thicker at that side located over the groove of its base piece and extending below the top-piece of the adjoining unit.

6. A flooring, or surface, consisting of a plurality of composite units, each composed of a base-piece and a top-piece, said units being arranged side by side in the same plane, the joined faces of said pieces being provided with interlocking protuberances adapted to require the relative displacement of the top-piece in a direction approximately parallel with the plane of its under side, in order to separate said pieces, the abutting side faces of the base pieces of said units being oblique and provided with interlocking elements of the tongue and groove type respectively, the interlocking protuberance of said top-piece being thicker at that side located over the groove of its base-piece and extending below the top-piece of the adjoining unit, also extending a substantial distance towards the longitudinal middle of the unit.

7. In flooring units consisting of elongated top and bottom members of substantially equal width and adapted to fit in vertical alinement one with the other, engaging means on the abutting faces of the members requiring the displacement of the members sidewise to permit their separation.

8. In flooring units consisting of elongated top and bottom members of substantially equal width and adapted to fit in vertical alinement one with the other, engaging means on the abutting faces of the members requiring the displacement of the members sidewise to permit their separation, said members being cemented in engaging position.

ROSS HOUSTON.